(12) United States Patent
Yaniv

(10) Patent No.: US 6,310,675 B1
(45) Date of Patent: Oct. 30, 2001

(54) LIQUID CRYSTAL DISPLAY

(76) Inventor: Zvi Yaniv, 5810 Long Ct., Austin, TX (US) 78730

(*) Notice: Subject to any disclaimer, the term of this patent is extended or adjusted under 35 U.S.C. 154(b) by 0 days.

(21) Appl. No.: 09/205,213

(22) Filed: Dec. 4, 1998

Related U.S. Application Data

(63) Continuation-in-part of application No. 08/996,224, filed on Dec. 22, 1997, now Pat. No. 6,147,666.

(51) Int. Cl.⁷ .................................................. G02F 1/1343
(52) U.S. Cl. ............................................... 349/141; 349/33
(58) Field of Search ............................... 349/141, 31, 33, 349/143, 34

(56) References Cited

U.S. PATENT DOCUMENTS

| | | | |
|---|---|---|---|
| 3,794,405 | * | 2/1974 | Masi ...................................... 349/122 |
| 4,759,609 | * | 7/1988 | Clerc ...................................... 349/87 |
| 4,775,224 | * | 10/1988 | Germain et al. ........................ 349/36 |
| 4,896,945 | * | 1/1990 | Ooba et al. ............................. 349/33 |
| 4,937,539 | * | 6/1990 | Grinberg et al. ...................... 349/202 |
| 5,313,562 | * | 5/1994 | Wiltshire ................................ 349/74 |
| 5,596,430 | * | 1/1997 | Hasegawa et al. ..................... 349/74 |
| 5,905,557 | * | 5/1999 | Yaniv ..................................... 349/143 |
| 5,926,244 | * | 7/1999 | Takeda et al. ......................... 349/139 |
| 5,949,511 | * | 9/1999 | Park ....................................... 349/139 |
| 5,995,182 | * | 11/1999 | Watanabe .............................. 349/110 |
| 6,005,650 | * | 12/1999 | Kim et al. ............................. 349/130 |
| 6,097,465 | * | 8/2000 | Hiroki et al. ......................... 349/141 |

FOREIGN PATENT DOCUMENTS

| | | | |
|---|---|---|---|
| 56-164317 | * | 1/1981 | (JP) . |
| 58-2872 | * | 1/1983 | (JP) . |
| 60-217336 | * | 10/1985 | (JP) . |

OTHER PUBLICATIONS

Kallard, "Liquid Crystals and Their Applications", Optosonic Press 1970, pp. 99–101.*

* cited by examiner

*Primary Examiner*—Kenneth Parker

(57) ABSTRACT

An improved efficiency liquid crystal display device (10) includes at least two pairs of electrode disposed above and below, and on two sides of each display pixel (12). Each pair of electrodes is capable of applying an electrical field to a layer of liquid crystal material disposed therebetween. The applied electrical fields cause the liquid crystal materials to switch from a first to a second optical state corresponding to an opaque and transparent state. The result is a display device having higher optical efficiencies, and faster display response times. Multiple intermediate optical states are possible by applying varying amounts of electrical charge to the two pairs of electrodes at the same time. The desired optical effects are accomplished by employing in-plane-switching to said pairs of electrodes.

13 Claims, 4 Drawing Sheets

LIQUID CRYSTAL DISPLAY

CROSS-REFERENCE TO RELATED APPLICATIONS

This application is a continuation in part of U.S. patent application Ser. No. 08/996,224 filed on Dec. 22, 1997, Now U.S. Pat. No. 6,147,666 in the name of Zvi Yaniv and entitled "MULTIPOLE LIQUID CRYSTAL DISPLAY."

TECHNICAL FIELD

This invention relates in general to flat panel display devices, and in particular to multipole liquid crystal display devices having a plurality of spaced electrodes, in both X and Y direction, for effecting a change in the optical characteristics of the liquid crystal material.

BACKGROUND

Flat panel display devices are increasingly gaining market acceptance for a variety of different applications. For example, active matrix liquid crystal displays (AMLCD's) have found widespread use as the video monitors in laptop computers, video cameras and avionic navigation modules, to name but a few devices. Other types of display devices such as electroluminescent (EL) and field emissive displays (FED's) are also used in a variety of industrial and consumer applications. The advantage of each of these types of devices resides in the fact that they are all substantially flat, particularly as compared to the cathode ray tube that has been in use for the past fifty years.

In the AMLCD, the elements which cause the device to effect a desired optical characteristic are typically sandwiched between a pair of thin glass plates. These elements include first and second patterned electrodes for applying an electrical field to liquid crystal (LC) material disposed therebetween. Each pair of oppositely disposed patterned electrodes define a single picture element or pixel. The liquid crystal material typically is a conventionally known liquid crystal material, such as cholesteric, polymer dispersed liquid crystal materials, twisted nematic (TN), supertwist nematic (STN), chiral smectic and others. The application of an electrical field to the LC material causes it to change its orientation from a first condition to a second condition, for example, transparent to opaque. However, in order to control the orientation of the liquid crystals, it is necessary to provide numerous other optical elements, such as at least a pair of polarizers, and a plurality of alignment layers. A conventional AMLCD is fully described in, for example, U.S. Pat. Nos. 4,666,252, 4,715,685 and 5,061,040 all to Yaniv, et al., the disclosures of which are incorporated herein by reference. An additional U.S. Pat. No. 4,961,630 to Yaniv and Baron, teach an AMLCD having three electrodes, the third electrode provided to increase device capacitance.

Unfortunately, the construction of conventional AMLCD's and STN based displays generally is that using a twisted mode configuration leads to numerous deficiencies and disadvantages. For example, the need to provide two polarizers for conditioning the optical output substantially lowers the transparency of the device. The result is a darker display or alternatively one requiring a larger, i.e., higher powered backlight Accordingly, the polarizers either result in the need for larger backlights, increasing cost or have poorer color intensity, resulting in diminished display performance. Additionally, at least one, and typically a pair of alignment layers are necessary for purposes of properly orienting the liquid crystal molecules upon the application or removal of the electrical field. However, these layers must be carefully applied in order to achieve perfect orientation. The steps involved in depositing and preparing the alignment layers are difficult, time consuming, and introduce numerous opportunities for defects in the devices. Accordingly, the alignment layer contributes to lower device manufacturing yields and increased device costs.

Additional limitations to conventional AMLCD's resides in the basic characteristics of the LC material. Specifically, upon application of an electric field, the LC molecules will align themselves according to the field, including any effect of the interposed alignment layers, providing a desired optical effect Removal of the electrical field allows the LC molecules to "relax" back to the original state of orientation. However, the speed of relaxation is considerably slower than the speed of orientation in response to the electric field. This phenomenon has severe consequences for high speed operation of AMLCD's, and in particular STN's.

The problems noted above are further exacerbated when the device reaches higher temperatures, as can happen upon prolonged exposure to high intensity backlights. The high temperature dependency also has substantial consequences in terms of the types of application in which such a display may be used. For example, poor high temperature performance eliminates reliable use of AMLCD's in automotive applications. Operation speed is likewise deleteriously effected by lower temperatures, which substantially slow both excitation and relaxation speeds.

An additional deficiency of conventional AMLCD's relates to the relatively poor viewing angles of the devices. By this it is meant that the display appearance, at angles substantially off 90 degrees to the surface of the display, is substantially degraded. This degradation is due to the inherent characteristics of the polarized light emitted from a twisted configuration (IN, STN, etc.) AMLCD in conjunction with the need to interpose polarizers and alignment layers on the device substrates.

Accordingly, there exists a need for a display device which provides the desired changes and control in optical characteristics, while avoiding the problems inherent in conventional LCD's. Such a device should be easier to fabricate, have fewer optical components, and superior optical and electrical efficiency. The devices should also be easily adaptable to conventional semiconductor fabrication techniques, or even better, to screen printing technology, which is both simpler and less costly. The improved device should reduce dependency on polarizers and alignment layers to effect the desired optical performance.

SUMMARY OF THE INVENTION

Briefly, according to the invention, there is provided a flat panel display device including at least one display pixel element, and including first and second display substrates arranged in spaced, parallel relationship. The display includes at least first and second display electrodes disposed on the first substrate, and further includes at least third and fourth display electrodes disposed on the second substrate. The at least first and second electrodes are electrically isolated from said at least third and fourth electrodes. A layer of liquid crystal material disposed between said first and second electrodes and said third and fourth display electrodes, and defining said at least one display pixel. Of course, such a display may include any number of display pixels, the number depending only on the application of the display device. Such a device may need only a single polarizer as will be described in greater detail hereinbelow.

In operation, the liquid crystal display device effects first and second optical states, corresponding to a transparent and an opaque state. These states are achieved by applying a first electrical field across the first pair of display electrodes so as to obtain said first optical state, and applying a second electrical field across the second pair of display electrodes to obtain the second optical state. Switching of the display electrodes is accomplished by in-plane switching. Of course, it is understood that multiple states i.e., gray scale, may be accomplished via charge balancing. This is done by applying charge to both the first and second electrodes and the third and fourth electrodes in appropriately measured amounts. This will allow one to control the orientation of the liquid crystal material, hence the optical characteristic of a single pixel and the whole display

Figure 1:
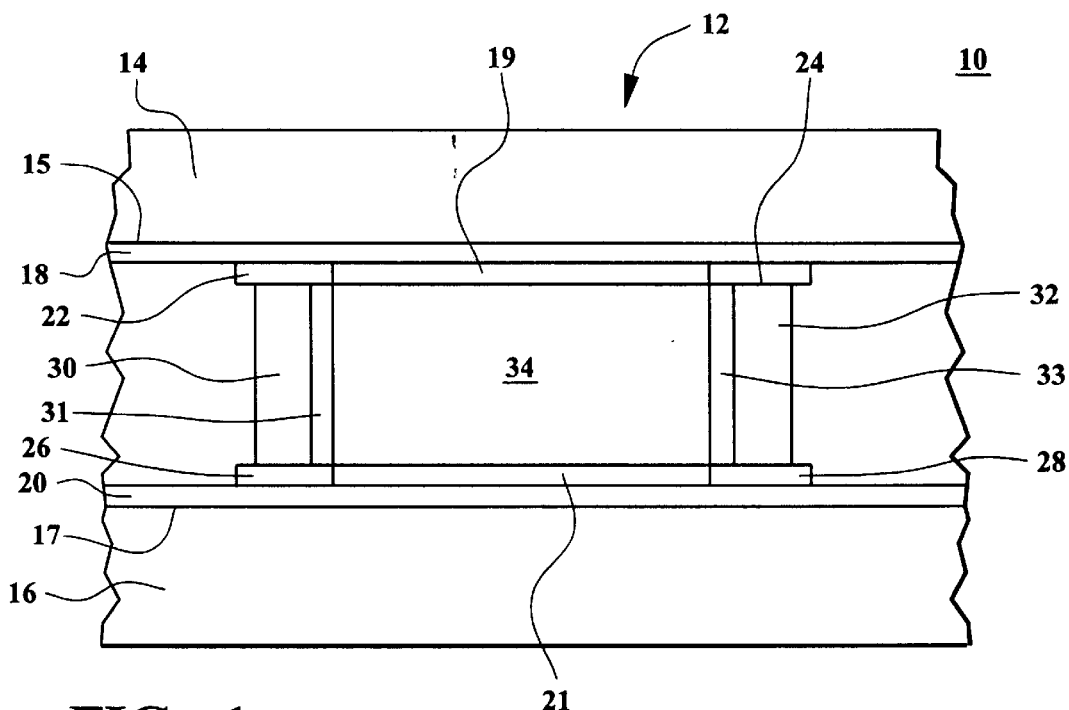
FIG. 1 is a cross sectional side view of a single liquid crystal display (LCD) pixel, in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a cross sectional side view of a single liquid crystal display (LCD) 10 pixel 12, in accordance with the instant invention. It is to be noted that while but a single display pixel is illustrated in FIG. 1, the invention is not so limited. The display 10 may comprise any number of display pixels arranged in, for example, rows and columns or any other configuration.

The LCD 10 includes first and second display substrates 14 and 16 arranged in spaced, parallel relationship to one another. The substrates 14 and 16 are preferably fabricated from one of a number of known materials in the art, examples including a series of display glasses manufactured by Corning, among others. Other types of glasses, plastics, ceramics and polymers may also be advantageously employed. Indeed, transparent plastics may be advantageously employed for purposes of making flexible display devices.

Upon surfaces 15 and 17 of substrates 14 and 16 respectively is disposed layers of electrically conductive material 18 and 20. The layers of electrically conductive material are preferably substantially transparent, and may be fabricated from a transparent conductive oxide material selected from the group consisting of indium oxide, tin oxide, indium tin oxide, and other commonly known transparent conductive oxide materials. Alternatively, the layers of conductive material may be fabricated of thin metal films, doped semiconductor materials, and any of a host of other materials which may be substantially transparent and electrically conductive. These layers of electrically conductive, transparent material are the first and second substrate electrodes for the pixel 12.

Disposed upon transparent conductive layers 18 and 20 are electrically insulating pads. Specifically electrically insulating pads 22 and 24 are disposed on layer 18, while pads 26 and 28 are deposited on layer 20. The function of the pads is to provide electrical isolation between the first and second substrate electrodes and the third and fourth electrodes 30 and 32 described in greater detail herein below. As will be appreciated from a perusal of FIG. 2, electrodes 30 and 32 may be fabricated as elongated rows or columns of electrode material, and hence the electrically insulating pads must therefore be disposed in like manner, i.e., as elongated rows or columns of insulating material. The electrically insulating pads 22, 24, 26, 28 are preferably fabricated of a deposited material selected from the group consisting of silicon oxide, silicon nitride, polyimide, tantalum pentoxide, and other well know insulating material, organic or inorganic, and combinations thereof. In one embodiment, the insulating material, for example silicon nitride, is deposited to a thickness of between about 0.1 and 1.0 microns ($\mu$m) and preferably 0.2 and 0.3$\mu$m.

The third and fourth electrodes 30 and 32 are deposited on the insulating pads so as to be electrically isolated from electrodes 18 and 20. The electrodes are preferably fabricated of a material such as that described above with respect to electrodes 18 and 20. Alternatively, electrodes 30 and 32 may be fabricated from a material selected from the group consisting of metals, metal pastes, composites such as copper, and combinations thereof. In one preferred embodiment, third and fourth electrodes 30 and 32 are fabricated of, for example copper, and are deposited to a height of between 1.0 and 10.0 $\mu$m and preferably about 5.0 $\mu$m, and a thickness of less than about 10 $\mu$m. The third and fourth electrodes may be spaced apart any distance appropriate for a given application but are most preferably spaced a distance of between about 1.0 and 20.0 $\mu$m and preferably about 10.0 $\mu$m. It may be appreciated from a perusal of FIG. 2 that the spacing of the electrodes will define the size of the display pixel. The third and fourth electrodes also provide the advantage of acting as spacers between the first and second substrates. It is a well known problem in the liquid crystal display industry that, because the two thin glass substrates tend to curve towards each other, spacers need to be provided in the LC material in order to maintain absolutely uniform spacing, and hence proper device operation. Prior art attempts to accomplish this have met with varying degrees of success. Hence, the structure of the instant display solves another long standing problem in the industry.

Disposed between electrodes 18, 20, 30 and 32 is a layer of liquid crystal material 34. The liquid crystal material is preferably a nematic type material such as a twisted nematic or supertwist nematic liquid crystal material. Other types of liquid crystal material may also be employed. The important feature of the material is that it have first and second orientations. That is, the molecules of material line up in first and second conditions effecting first and second optical states such as transparent or opaque.

Figure 2:
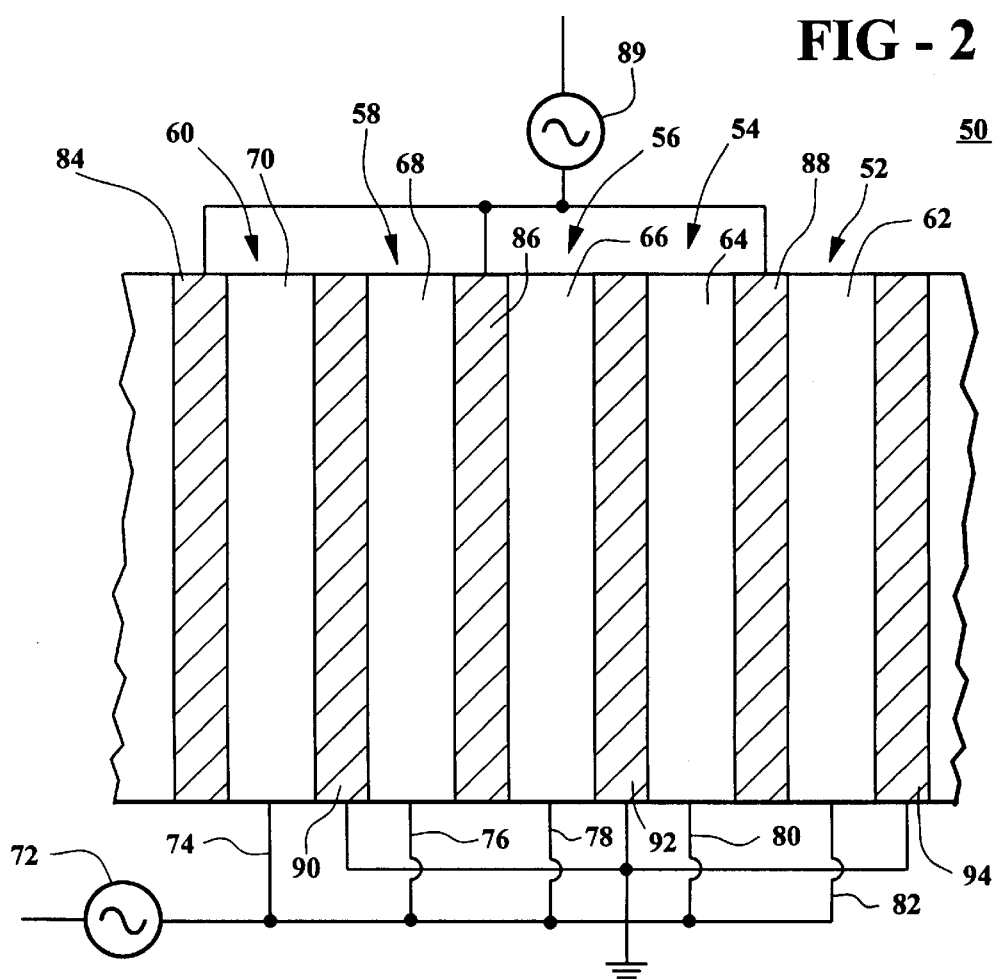
FIG. 2 is a schematic view, from above, of a LCD in accordance with the instant invention.
Figure 3:
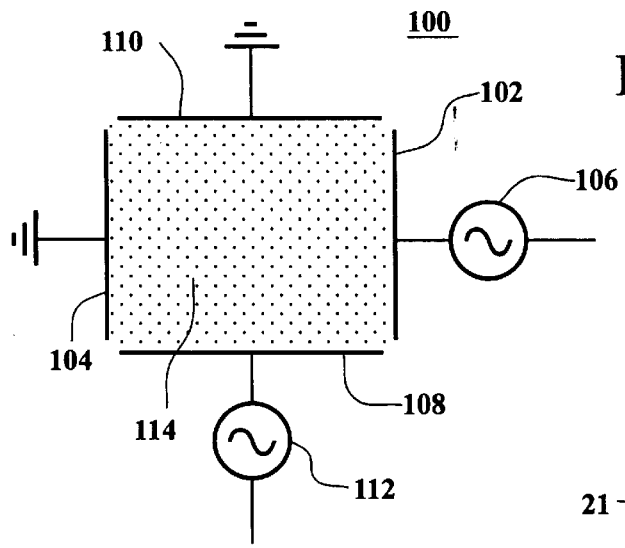
FIG. 3 is a schematic diagram of the electrical features of a LCD, in accordance with the instant invention.

Referring now to FIG. 2, there is illustrated therein a schematic view, from above, of an LCD 50 in accordance with the instant invention. As the view of FIG. 2 is from above, only one of the display substrates i.e., the first display substrate, is visible. The LCD comprises five columnar pixels 52, 54, 56, 58, 60, though it is to be understood that a display according to the instant invention may comprise any number of pixels, in any shape and any configuration. Each pixel 52, 54, 56, 58, 60 includes a first display substrate electrode 62, 64, 66, 68, 70 electrically coupled to a power source 72 via conductive line 74, 76, 78, 80 and 82. The power source supplies an electric field to each pixel for purposes of changing the orientation of LC material disposed therein. The supplied electric field passes to ground via the second display substrate electrode of FIG. 1, not show in FIG. 2.

The display 50 further comprises a plurality of third electrodes 84, 86 and 88 electrically coupled to a second power source 89 and a plurality of fourth electrodes 90, 92, 94 all electrically coupled to ground. As described above, an electrical field is applied to each pixel 52, 54, 56, 58, 60 by pairs of the third and fourth electrodes. In particular, pixel 52 has an electrical field applied to it by third electrode 88 which field is coupled to ground via electrode 94. Similarly, pixel 54 has a field applied to it via third electrode 88 which passes to ground via fourth electrode 92.

As may be further appreciated from a perusal of FIG. 2, disposing two such displays in an orthogonal relationship will yield the equivalent of an active matrix LCD, without the need to provide the active addressing components which contribute so substantially to the cost of such devices. Also, it is to be noted that the display device described in FIGS. 1 and 2 do not require the other optical components characteristic of AMLCD's. In particular, no polarizers are required for the display of the instant invention, nor are alignment layers required. This substantially reduces both the cost and complexity of manufacturing a display.

Referring now to FIGS. 3–6 there is illustrated therein a schematic diagram of the electrical features of an LCD, in accordance with the instant invention, from which the operation of an LCD in accordance with the instant invention may be understood. A single pixel 100 is illustrated which includes four electrodes arranged in pairs of two, as described hereinabove. The first pair of electrodes includes electrodes 102 and 104, in which electrode 102 is coupled to a power source 106, while electrode 104 is coupled to ground. The second pair of electrodes includes electrodes 108 and 110, in which electrode 108 is coupled to a power source 112, while electrode 110 is coupled to ground. Liquid crystal material 114 is disposed between the electrodes.

Figure 4:
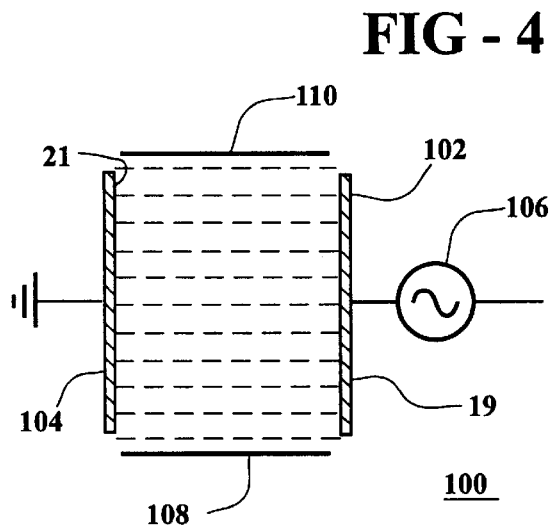
FIGS. 4–6 illustrate operation of a LCD in accordance with the instant invention.
Figure 5:
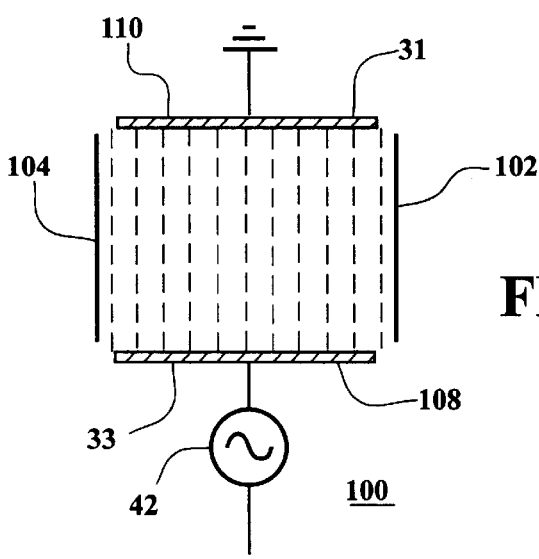

In operation, and as is illustrated in FIG. 4, a first electrical field is applied to the liquid crystal material 114 via electrodes 102 and 104 causing the molecules of the LC material to align with the applied field and effecting a desired optical characteristic, for example an opaque appearance of the display pixel. Thereafter, and as is illustrated in FIG. 5, a second electrical field is applied via electrodes 108 and 110 causing the molecules of the LC material to align themselves with the second applied field, effecting a second optical characteristic, for example transparent The advantage of this configuration is that display operation is based only on field effects without relying on elastic modes as is the case with conventional AMLCD's. As a consequence, problems with response speed, and temperature dependency are eliminated.

Figure 6:
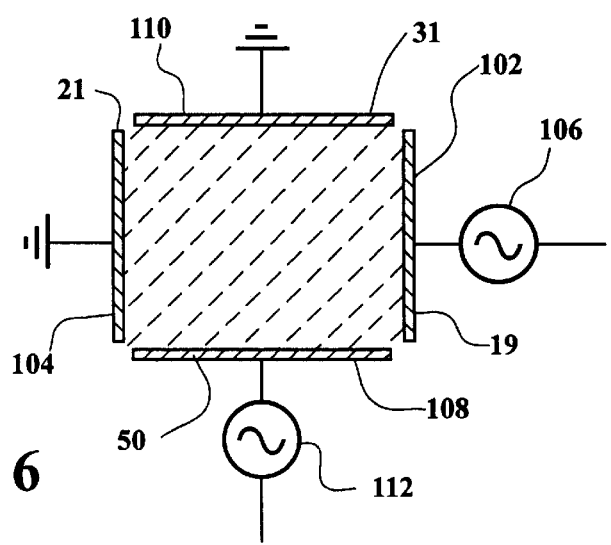

In order to achieve an optical characteristic between fully transparent (white assuming a white backlight) and opaque (black), a field may be applied to both pairs of electrodes, i.e., the first pair comprising electrodes 102 and 104, and the second pair comprising electrodes 108 and 110. This intermediary condition, known as gray scale operation, may be varied depending on the relative amounts of charge applied by each pair of electrodes. For example, assuming the operation in FIG. 4 is opaque, and FIG. 5 is transparent, by applying slightly more charge to electrodes 108 and 110 than to electrodes 102 and 104, one may accomplish a gray scale which is slightly more transparent that opaque. This is illustrated in FIG. 6. In essence, the embodiment of FIG. 6 represents an intermediate optical effect between that of FIG. 4 and FIG. 5. It will be therefore understood that a large number of intermediate optical states may be produced by simply varying the size, extent and duration of the electrical fields applied to the pairs of electrodes.

It is to be understood that the illustrations of FIG.s 3–6 are two dimensional representations of the three dimensional reorientation of the liquid crystal materials of the display. In particular, the illustrations of FIG.s 4 and 5 are such that the molecules of liquid crystal material appear to reorient from an "X" axis to a "Y" axis, both in the same plane. However, as is apparent from FIG. 1, the two pairs of electrodes are not in the same plane. Accordingly, the liquid crystal material is actually reorienting in the "X", "Y" and "Z" axis wherein the "Z" axis is perpendicular to the plane of the page on which the FIG.s appear. Viewed differently, the "Z" axis may be thought of as the directions perpendicular to the plane of electrodes 18 and 20 of FIG. 1.

Figure 7:
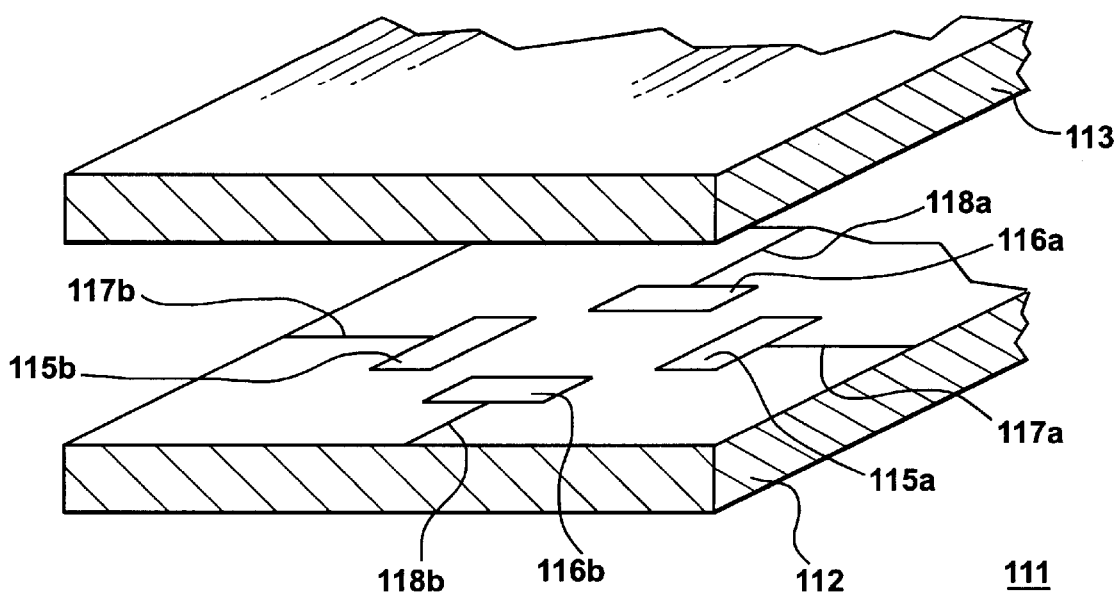
FIG. 7 is a perspective side view of a first alternative embodiment of a single liquid crystal display pixel, in accordance with the instant invention.

Referring now to FIG. 7, there is illustrated therein a perspective side view of a first alternative embodiment of a display device in accordance with the instant invention. The display device 111 comprises first and second substrates 112, and 113, both fabricated of materials such as those described hereinabove. Thereafter, a plurality of display picture elements or pixels are formed on the first substrate 112. As may be appreciated from a perusal of FIG. 7, a single such picture element 114 is illustrated for simplicity sake, but those of ordinary skill in the art will understand the fabrication for many such pixels from the following description of the fabrication of pixel 114.

Pixel 114 comprises two pairs of electrodes, both disposed upon the first substrate 112. The first set of electrodes 115a and 115b are disposed in opposite, parallel and facing relationship, while the second set of electrodes 116a and 116b are likewise disposed, though perpendicular to the axis of the first set of electrodes. Accordingly, it may be appreciated that the four electrodes define the generally square area of the pixel. Into the central area defined by the two sets of electrodes is disposed a layer of a liquid crystal material as described above.

Electrodes 115a and 115b are electrically coupled to sources of electrical charges or pulses (not shown) by electrically conductive lines 117a and 117b respectively. Electrodes 116a and 116b are likewise electrically coupled via conductive lines 118a and 118b. The electrodes, liquid crystal material and electrically conductive lead lines are all sealed between the first and second substrates in a manner well known in the art In operation, the liquid crystal material sealed between the substrates and the two sets of electrodes may be caused to switch between a first and a second optical state by the application of in-plane switching, as is described in greater detail hereinbelow. However, it may be appreciated that by applying a first electrical charge to, for example, electrodes 115a and 115b, the molecules of liquid crystal material may be made to align in a first direction, thus causing them to yield an opaque appearance. Subsequently, a second electrical charge may be applied by electrodes 116a and 116b causing the molecules of liquid crystal material to align in a second direction, thus yielding a transparent optical condition.

Figure 8:
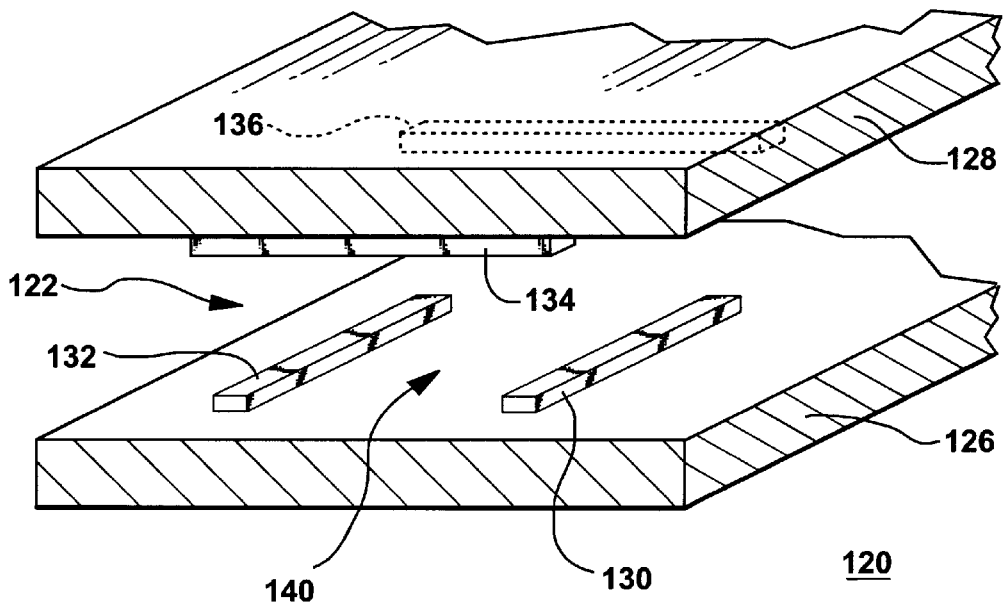
FIG. 8 is a perspective side view of a second alternative embodiment of a liquid crystal display, in accordance with the instant invention.

Referring now to FIG. 8, there is illustrated therein a cross sectional side view of an alternative embodiment of a single liquid crystal display 120 pixel 122, in accordance with the instant invention. It is to be noted that while but a single display pixel is illustrated in FIG. 8, the invention is not so limited. It may be appreciated that one of the features which distinguishes the display of FIG. 7 from that of FIG. 8 is that in FIG. 7 all of the electrodes for a single pixel are disposed on one substrate. Conversely, in FIG. 8 one set of electrodes is disposed on the first substrate, while a second set is disposed on the second substrate. The display 120 may comprise any number of display pixels arranged in, for example, rows and columns or any other configuration.

The LCD 120 includes first and second display substrates 126 and 128 arranged in spaced, parallel relationship to one another. The substrates 126 and 128 are preferably fabricated of materials such as those described hereinabove with respect to the display device of FIG. 1. Disposed on the first substrate 126 are at least first and second elongated strip electrodes 130, 132, while at least third and fourth electrodes 134, 136 are disposed on second substrate 128. Hence a single display pixel element is defined by four electrodes, 130, 132, 134, and 136, which are disposed, as may be appreciated from a perusal of FIG. 7, in facing, opposed, orthogonal relationship to one another. When assembled, the first and second substrates with associated electrodes are placed in close proximity to one another, and a layer of liquid crystal material is 140 is disposed therebetween. The liquid crystal material may be any of those types of materials described herein.

The electrodes are preferably fabricated of the types of materials described hereinabove with respect to the devices described with reference to FIG.s 1 and 2. It is to be understood that the display device illustrated in FIG. 7 may include any number of elongated columnar electrodes on each display substrate, the number of electrodes defining the number of display pixels the display device will have. The operative distinction being that each pixel be defined by at least a first and second electrode on a first substrate, and at least a third and fourth electrode on the second substrate. It is also to be understood that the display device may include at least one polarizer disposed on either the first or second display substrate. In the embodiment illustrated in FIG. 7, the polarizer 142 is disposed on substrate 128, on the side thereof opposite electrodes 134 and 136. Alternatively, the polarizer may be disposed on the first display substrate or on opposite sides of the substrate.

Figure 9:
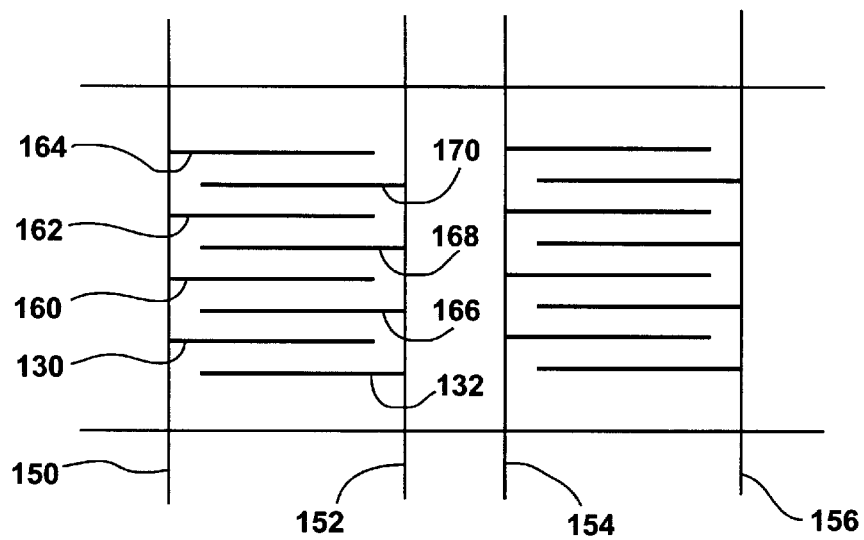
FIG. 9 is a schematic view of the alignment of electrodes on the first and second substrates of a display as illustrated in FIG. 8.

FIG. 9 is schematic view of the alignment of electrodes on the first and second substrates of a display as illustrated in FIG. 8. In FIG. 9, a first substrate, for example 126 of FIG. 8, includes a plurality of electrically conductive leads 150, 152, 154 and 156 all coupled to sources of electrical charge or signals (not shown). The electrically conductive leads are preferably fabricated of electrically conductive materials such as those described above for use in the liquid crystal display field. Electrically coupled to the first conductive lead 150 is a series of first electrodes such as 130 of FIG. 3 and electrodes 160,162 and 164. Likewise, coupled to conductive lead 152 is a series of second electrodes such as 132 of FIG. 8, and 166, 168 and 170.

As may be appreciated, first and second electrodes are similarly coupled to leads 154 and 156. It is to be noted that while FIG. 9 illustrates only two sets of conductive leads with only four pairs of electrodes couple to each, the invention is not so limited. Any number of sets of conductive leads, with any number of sets of electrodes may be provided in order to accomplish a display device of a particular desired size, shape or resolution. The number and spacing of the leads and electrodes have been chosen herein only for purposes of easily illustrating the instant invention. It is also to be appreciated that the second substrate will comprise a series of electrically conductive leads coupled to sets of electrodes just as is illustrated in FIG. 9. The only difference, as has already been illustrated in FIG. 8 is that the second substrate is aligned so that the electrodes disposed thereon are perpendicular to the electrodes on the first substrate.

In operation, and referring now to FIG.s 10–12, molecules of liquid crystal material may be switched from a first to a second state by means of in-plane switching. In-plane-switching ("IPS") is described in a paper entitled *An Advanced In-Plane-Switching Mode TFR-LCD*, to Wakemoto, et al., published in the SID 97 Digest, page 929, the disclosure of which is incorporated herein by reference. It is to be understood that the IPS of the Wakemoto, et al reference is directed to its application in a conventional AMLCD, while as used herein, IPS is applied to the inventive display structure described hereinabove. Accordingly, as used in a conventional AMLCD, IPS relates to the behavior of the liquid crystal materials when exposed to an electrical charge as applied across a pair of electrodes, one disposed on a first substrate, and the second disposed on a second substrate. Conversely, in the instant display device, IPS is applied first between the electrodes of the first display substrate to cause a first liquid crystal orientation, then subsequently IPS is applied between the electrodes of the second display substrate to cause a second liquid crystal orientation.

Figure 10:
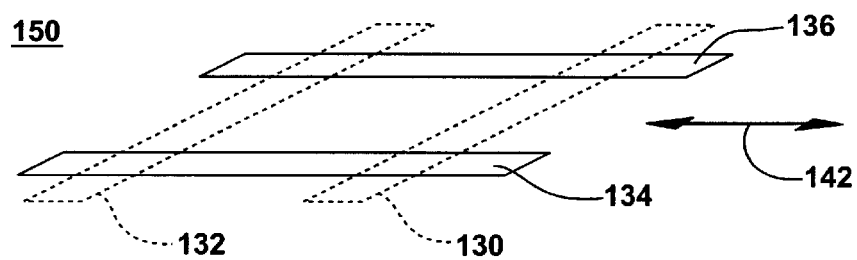
FIGS. 10–12 illustrate operation of the display of FIG. 8.
Figure 11:
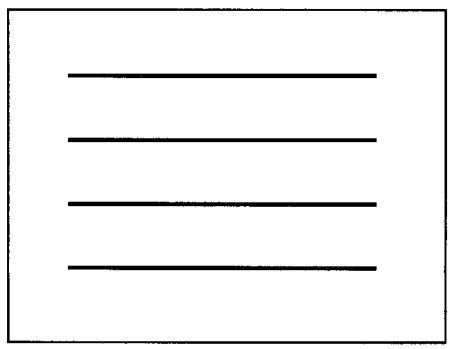

Referring now to FIG. 10, there is illustrated therein a partial, top perspective view of a single display pixel of a display in accordance with the instant invention. The pixel 150 includes electrodes 130, 132 (in phantom) on the first substrate (not shown) disposed below electrodes 134, 136 on the second substrate, also not shown. For ease of illustration, neither the layer of LC material nor the polarizer lay are shown, though both are present To understand operation of the pixel however, the axis of the polarizer is parallel to electordes 134 and 136, and perpendicular to electrodes 130 and 132 In a first state, illustrated in FIG. 11, the molecules of liquid crystal material 140 are arranged so as to be parallel with electrodes 130, 132, and perpendicular to the axis of polarizer 142. This is accomplished by applying an electrical charge in the plane between electrodes 134 and 136 so as to accomplish the desired orientation of the liquid crystal molecules. In this state, the display pixel would appear opaque, that is no light would be transmitted from a backlight disposed behind the display. Alternatively, in the embodiment in which the display is a reflective display (i.e., one in which a layer of a reflecting material as is well know in the art, is disposed on the first substrate, so that light entering the display pixel is reflected back out of the display), the opaque condition of the liquid crystal material prevents light from striking the reflective material, and hence from being reflected back out.

Figure 12:
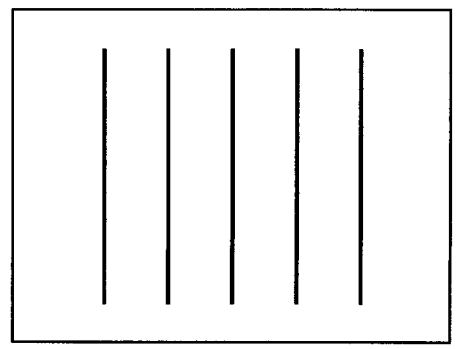

In order to achieve a transparent or reflective condition (depending on the type of display) an electrical field is applied between electrodes 130 and 132 via inplane switching. This causes the molecules of liquid crystal material to be aligned parallel with electrodes 134 and 136, and the axis of the polarizer, as illustrated in FIG. 12.

While the display described hereinabove works as described, without the additional elements commonly present in conventional display devices, it is to be understood that such expedients may be employed in a display such as that described herein. For example, the control of the electrodes may be aided by using switching elements such as thin film transistors ("TFTs"), diodes, or other commonly know devices. Additionally, while an alignment layer is not required, one or more such layers may be employed. Similarly, one or more color filter layers may be employed in combination with the substrates of the display device to achieve full color display devices.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A flat panel display device including a plurality of display pixel elements, each said pixel element comprising four electrodes, said display device comprising:
    a first display substrate having at least a first display electrode for each pixel element disposed thereon;
    a second display substrate having at least a second display electrode for each pixel element disposed thereon;
    a third and a fourth pixel element electrodes disposed between said first and second display substrates and electrically insulated from said first and second electrodes; and
    a layer of liquid crystal material disposed between said first and second display electrodes and said third and fourth display electrodes.

2. A flat panel display device as in claim 1, wherein said electrodes are electrically conductive and substantially optically transparent.

3. A flat panel display device as in claim 1, wherein said first and second display substrate electrodes are fabricated from a material selected from the group consisting of indium oxide, tin oxide, indium tin oxide, thin metal films, and combinations thereof.

4. A flat panel display device as in claim 1, wherein said third and fourth electrodes are fabricated of materials selected from the group of materials consisting of transparent conductive oxides, thin metal films as copper, silver, aluminum, and gold, metal composites, and combinations thereof.

5. A flat panel display device as in claim 1, wherein said display device comprises a plurality of display pixels.

6. A flat panel display as in claim 1, wherein said second display substrate is arranged in spaced, parallel relationship with said first display substrate, and said third and fourth electrodes are arranged orthogonally to said first and second electrodes on said first substrate.

7. A flat panel display device as in claim 6, wherein said display is a reflective display.

8. A flat panel display device as in claim 1, further including a backlight disposed behind said display.

9. A flat panel display device as in claim 1, further including a layer of a light reflecting material disposed on said first substrate.

10. A flat panel display device as in claim 9, wherein said polarizing device is associated with said second substrate.

11. A flat panel display device as in claim 1, wherein said display is an active matrix liquid crystal display.

12. A flat panel display device as in claim 1, further including at least one polarizing device.

13. A flat panel display device as in claim 1, further including a color filter device operatively associated with said device.

* * * * *